US012266275B2

(12) United States Patent
McAuley

(10) Patent No.: US 12,266,275 B2
(45) Date of Patent: Apr. 1, 2025

(54) SYSTEMS AND METHODS FOR FACILITATING LEARNING THROUGH INTERACTION WITH OBJECTS IN AN ENVIRONMENT

(71) Applicant: Talkiwear Pty Ltd, Alphington (AU)

(72) Inventor: Annie Kathleen McAuley, Alphington (AU)

(73) Assignee: Talkiwear Pty Ltd, Alphington (AU)

( * ) Notice: Subject to any disclaimer, the term of this patent is extended or adjusted under 35 U.S.C. 154(b) by 0 days.

(21) Appl. No.: 17/747,108

(22) PCT Filed: Nov. 20, 2020

(86) PCT No.: PCT/AU2020/051253
§ 371 (c)(1),
(2) Date: May 18, 2022

(87) PCT Pub. No.: WO2021/097529
PCT Pub. Date: May 27, 2021

(65) Prior Publication Data
US 2023/0142950 A1 May 11, 2023

(30) Foreign Application Priority Data
Nov. 19, 2019 (AU) ................................ 2019904378

(51) Int. Cl.
*G09B 5/04* (2006.01)
*G06K 7/10* (2006.01)
*G06K 7/14* (2006.01)

(52) U.S. Cl.
CPC .......... *G09B 5/04* (2013.01); *G06K 7/10366* (2013.01); *G06K 7/1413* (2013.01); *G06K 7/1417* (2013.01)

(58) Field of Classification Search
CPC .............. A63H 2200/00; A63H 33/042; A63H 33/046; G09B 19/06; G09B 5/09; G09B 1/36; A63F 9/24; A63F 13/25
See application file for complete search history.

(56) References Cited

U.S. PATENT DOCUMENTS 10,857,450 B1 * 12/2020 Aman .................... A63F 13/213
2004/0214642 A1 10/2004 Beck
2004/0229195 A1 11/2004 Marggraff et al.
(Continued)

FOREIGN PATENT DOCUMENTS

| CN | 103049552 A | 4/2013 | |
| DE | 202013000802 U1 | 4/2014 | |
| GB | 242510 | * 9/2006 | ............... G09B 5/06 |

*Primary Examiner* — Robert J Utama
(74) *Attorney, Agent, or Firm* — SLEMAN & LUND LLP

(57) ABSTRACT

Embodiments generally relate to a media device for facilitating learning. The media device comprises a communications module for facilitating communication between the media device and a computing device; a processor; and memory accessible to the processor and storing executable code. When the executable code is executed by the processor, the processor is caused to: receive instructions from the computing device via the communications module and store the instructions to the memory; receive data indicative of user interaction with an identification tag, wherein the data comprises an identification code; determine a response to be delivered to the user based on the identification code; and cause the response to be delivered to the user.

20 Claims, 4 Drawing Sheets

(56) References Cited

U.S. PATENT DOCUMENTS

| | | |
|---|---|---|
| 2005/0143173 A1 | 6/2005 | Barney et al. |
| 2006/0139175 A1* | 6/2006 | Cosier .................. G09B 21/00 |
| | | 340/572.8 |
| 2008/0010110 A1 | 1/2008 | Neuhauser et al. |
| 2011/0132980 A1 | 6/2011 | Jang |
| 2012/0223477 A1* | 9/2012 | Zylkin ................. A63F 9/0468 |
| | | 273/146 |
| 2013/0059284 A1 | 3/2013 | Giedgowd, Jr. et al. |
| 2014/0274412 A1* | 9/2014 | Sabo ........................ A63F 9/24 |
| | | 463/42 |
| 2016/0210484 A1 | 7/2016 | Shi et al. |
| 2023/0059284 A1 | 2/2023 | Hakola et al. |

\* cited by examiner

SYSTEMS AND METHODS FOR FACILITATING LEARNING THROUGH INTERACTION WITH OBJECTS IN AN ENVIRONMENT

CROSS-REFERENCE TO RELATED APPLICATIONS

This application is a continuation of International Application Serial No. PCT/AU2020/0511253, filed Nov. 20, 2020, entitled "Systems and methods for facilitating learning through interaction with objects in an environment." and claims priority to Australian Application Serial No. AU 2019904378, filed Nov. 20, 2019, the contents of which are fully incorporated as if fully set forth herein.

TECHNICAL FIELD

Embodiments generally relate to systems and methods for facilitating learning through interaction with objects in an environment. In particular, embodiments relate to facilitating learning through oral and aural interaction with objects in an environment.

BACKGROUND

Teaching children languages and other skills is important for their development and growth, but can be limited by the amount of time instructors, such as parents and teachers, have available to facilitate that teaching. Many parents struggle to spend enough time engaging in interactive learning with their children, and teachers may not be able to give a child one-on-one attention in a busy classroom. Learning tools such as toys and books can be given to children to provide some educational benefit, but these tools lack contact based learning associations and the interaction that children can get from other human beings. Furthermore, while a number of educational applications and videos exist for children, many parents wish to lower the amount of screen time their children are exposed to, and to avoid the distractions that can come with providing children with devices such as tablets, smart phones and laptops.

It is desired to address or ameliorate one or more shortcomings or disadvantages associated with prior systems and methods for providing interactive context based learning to children, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a media device for facilitating learning, the media device comprising:
a communications module for facilitating communication between the media device and a computing device;
a processor; and
memory accessible to the processor and storing executable code, wherein when the executable code is executed by the processor, the processor is caused to:
receive instructions from the computing device via the communications module and store the instructions to the memory;
receive data indicative of user interaction with an identification tag, wherein the data comprises an identification code;
determine a response to be delivered to the user based on the identification code; and
cause the response to be delivered to the user;
wherein the media device is free from tactile user input devices and free from display screens.

Some embodiments further comprise a tag sensor module, wherein the computing device is configured to receive data indicative of user interaction with the identification tag from the tag sensor module.

Some embodiments further comprise an output module, wherein the computing device causes the response to be delivered to the user by outputting the response via the output module.

Some embodiments further comprise an input module, wherein the media device is configured to wake up from a sleep mode when user input is received via the input module.

Some embodiments further comprise an input module, wherein the media device is configured to power on from a powered down mode when user input is received via the input module. In some embodiments, the input module comprises an accelerometer. In some embodiments, the input module comprises a microphone.

According to some embodiments, the processor is further configured to receive media from the computing device via the communications module, and top store the media in memory. In some embodiments, the media is an audio file.

In some embodiments, the processor is further configured to store the identification code in memory. In some embodiments, the processor is further configured to retrieve the stored identification code from memory and send it to the computing device.

Some embodiments relate to a kit for facilitating learning via interaction with objects in an environment; the kit comprising:
at least one identification tag comprising an identification code;
a media device configured to read the identification code of the at least one identification tag, determine at least one media file associated with the identification code, and to deliver the media file to a user.

BRIEF DESCRIPTION OF DRAWINGS

Embodiments are described in further detail below, by way of example and with reference to the accompanying drawings, in which.

DETAILED DESCRIPTION

Embodiments generally relate to systems and methods for facilitating learning through interaction with objects in an environment. In particular, embodiments relate to facilitating learning through oral and aural interaction with objects in an environment.

Figure 1:
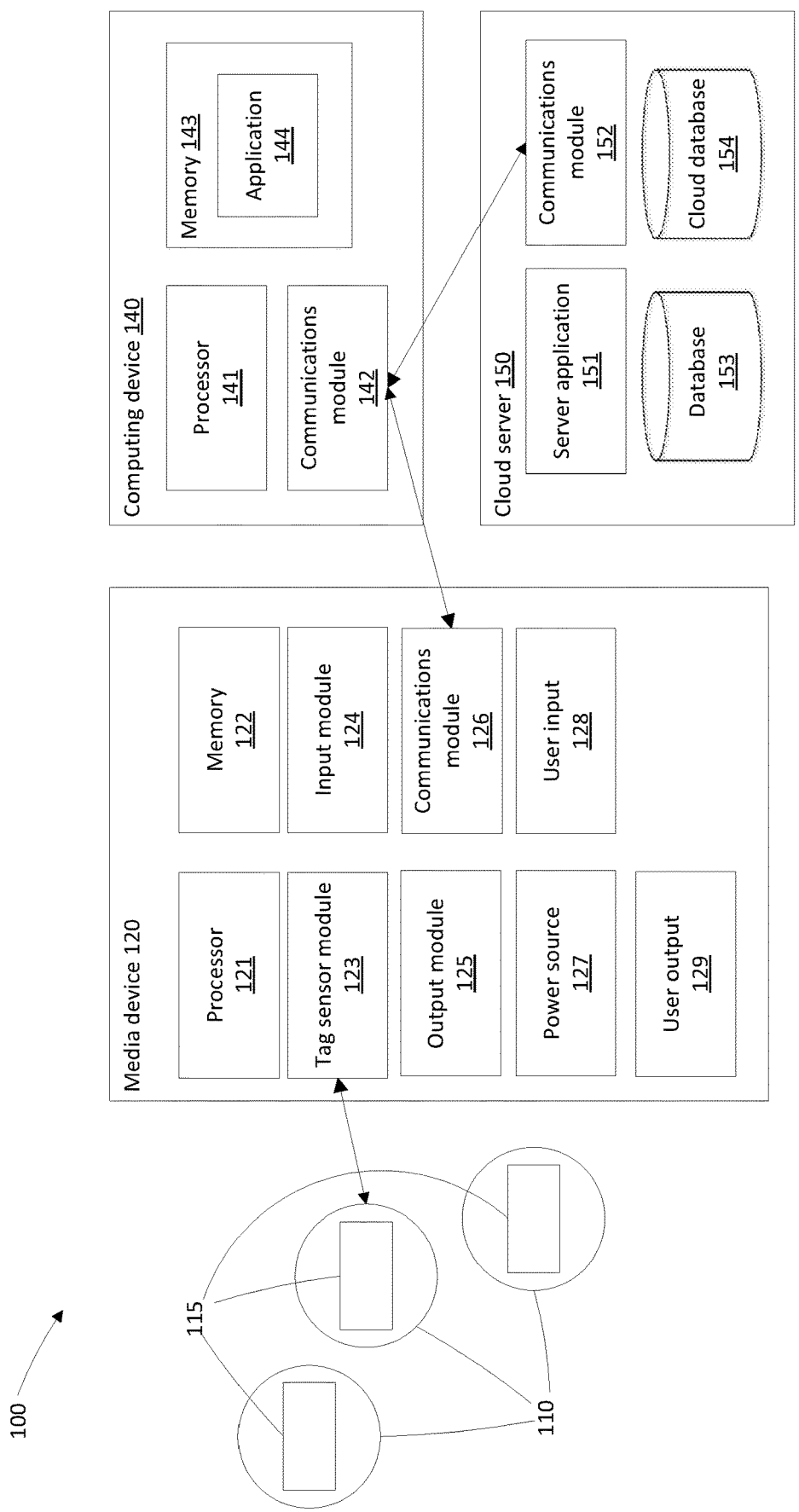
FIG. 1 shows a block diagram of an interactive learning system, according to some embodiments.

FIG. 1 shows a block diagram of an interactive system 100 for providing interactive learning experiences to a subject. System 100 is configured to provide active and interactive learning experiences by delivering educational content to a subject in context with the subject's environment.

According to some embodiments, system 100 includes at least one ID tag 110 and a media device 120 configured to communicate with the at least one ID tag 110. System 100 also includes a computing device 140 in communication with media device 120. Computing device 140 is also in communication with a cloud server 150.

In FIG. 1, three ID tags 110 are shown. However, system 100 may include one or more ID tags 110, including but not limited to 1, 2, 3, 4, 5, 6, 7, 8, 9 or 10 ID tags 110. In some embodiments, system 100 may not include any ID tags 110, as described in further detail below. ID tags 110 may store an identification code 115 that can be read by media device 120. Each ID tag 110 may have an individual and unique identification code 115. In some alternative embodiments, an identification code 115 may be shared by more than one ID tag 110. In some embodiments, each ID tag 110 may have an identification code 115 selected from a set of identification codes 115 stored on media device 120, computing device 140 or on cloud server 150.

Each identification code 115 may be associated with an object or location type. In some embodiments, object types may be associated with everyday objects and furniture found in the average home, such as table, chair, window, bed or bath, for example. Location types may be associated with areas or rooms common to an average home, such as kitchen, bedroom, bathroom, living room or play room, for example.

In use, ID tags 110 may be installed in a home, school, or other environment, with each ID tag being located on or in close proximity to the object or in the location with which it is associated. For example, a "table" type ID tag 110 may be located on or in close proximity to a table. A "bathroom" type ID tag 110 may be located in a bathroom or in close proximity to a bathroom, for example, on a bathroom door.

In some embodiments, ID tags 110 may be associated with persons, such as mum, dad, brother, sister, grandmother, grandfather, teacher, doctor, for example.

In some embodiments, ID tags 110 may be associated with toys and other play based and learning objects, such as a toy tiger, a toy apple, a toy dinosaur, a toy car, for example.

In some embodiments, ID tags 110 may be near field communication (NFC) tags, and identification codes 115 may be configured to be readable by an NFC reader device. In some embodiments, identification codes 115 may be visual codes such as barcodes or QR codes; RFID tags; magnetic tags; Bluetooth beacons, Wi-Fi enabled devices, infrared readable codes, or another type of code carrying data capable of being read by media device 120 using contact based or contactless communication. In some embodiments, identification code 115 may be written to ID tag 110 when each tag 110 is initialised during manufacture, and may be a permanent or persistent identification code that is un-editable and un-rewritable. In some alternative embodiments, data such as the identification code may be edited and written to ID tags 110 during their lifetime.

Referring again to FIG. 1, media device 120 comprises a processor 121 and optionally memory 122. In some embodiments, media device 120 may not comprise any memory 122, and may instead be configured to automatically communicate any captured data to computing device 140, and to automatically execute any commands received from computing device 140. In some embodiments, media device 120 may comprise a contactless smart card reader, which may be a PC-linked contactless smart card reader, such as the ACR122U NFC Reader by Advanced Card Systems Ltd, for example.

Where media device 120 does comprise memory 122, processor 121 may be configured to access data stored in memory 122, to execute instructions stored in memory 122, and to read and write data to and from memory 122, including media data. Processor 121 may comprise one or more microprocessors, central processing units (CPUs), application specific instruction set processors (ASIPs), or other processor capable of reading and executing instruction code. Memory 122 may comprise one or more volatile or non-volatile memory types, such as RAM, ROM, EEPROM, or flash, for example.

Processor 121 may be configured to communicate with one or more peripheral devices via one or more input and/or output modules. In some embodiments, processor 121 may be in communication with a tag sensor module 123 of the media device 120. Tag sensor module 123 may be a sensor component configured to read identification codes 115 from ID tags 110, and communicate the read data to processor 121. Tag sensor module 123 may comprise one or more of an NFC reader, magnetic code reader, RFID scanner, camera, or laser scanner, or may be otherwise configured to allow tag sensor module 123 to read identification code 115. In some embodiments, tag sensor module 123 may be configured to only read identification codes 115 from tags 110 that are in proximity with media device 120. For example, in some embodiments, tag sensor module 123 may be configured to read identification codes 115 from ID tags 110 that are within 10 cm of media device 120. In some embodiments, tag sensor module 123 may be configured to read identification codes 115 from ID tags 110 that are within 5 cm of media device 120.

As noted above, in some embodiments system 100 may not include any ID tags 110. In such embodiments, tag sensor module 123 may be configured to act as an object detection module. Tag sensor module 123 acting as an object detection module may be configured to detect and recognise objects and people by processing data received from input module 124. Tag sensor module 123 acting as an object detection module may be configured to process the received data to determine one or more of colour, shade, relative distance, relative positioning, shape, form, or pattern of an object proximate to media device 120, in some embodiments. According to some embodiments, tag sensor module 123 acting as an object detection module may perform one or more of binary fractal detection or contrast detection to detect and identify objects.

Tag sensor module 123 acting as an object detection module may determine one or more object or location type for each detected object. In some embodiments, object types may be associated with everyday objects and furniture found in the average home, such as table, chair, window, bed or bath, for example. Location types may be associated with areas or rooms common to an average home, such as kitchen, bedroom, bathroom, living room or play room, for example. In some embodiments, tag sensor module 123 acting as an object detection module may further be configured to perform facial recognition to detect and identify persons, such as mum, dad, brother, sister, grandmother, grandfather, teacher, doctor, for example.

In some embodiments, tag sensor module 123 acting as an object detection module may be configured to detect and identify toys and other play based and learning objects, such as a toy tiger, a toy apple, a toy dinosaur, a toy car, for example.

Processor 121 may also be in communication with an input module 124, which may be configured to receive data from user input 128, and send the received data to processor 121. For example, user input 128 may comprise an accelerometer according to some embodiments, allowing a user to communicate with media device 120 by moving, shaking, or otherwise physically interacting with media device 120. According to some embodiments, user input 128 may comprise a camera, allowing a user to communicate with media device 120 by capturing still or video image data. According to some embodiments, user input 128 may comprise one or more of a radar, infrared, non-infrared or electro-magnetic sensor. According to some embodiments, user input 128 may also include a microphone, allowing a user to communicate with media device 120 by speaking. In some embodiments, media device 120 is free of any tactile user input devices such as touch screen displays, buttons, dials or switches. This may be to reduce the number of elements of media device 120 that may provide a distraction to a child using media device 120.

Furthermore, processor 121 may be in communication with a communications module 126, which may be configured to allow media device 120 to communicate with external devices such as computing device 140. Communications module 126 may be configured to facilitate communication via a wired or wireless communication protocol, which may include Bluetooth, Bluetooth Low Energy, NFC, Wi-Fi, Ethernet, USB, cellular data, and/or any other communication protocols.

Media device 120 may further comprise an output module 125, and user output 128. User output 128 may comprise one or more output components, such as a speaker, light, buzzer or vibration motor. According to some embodiments, media device 120 may be free of any screen or display components, which may allow children to interact with media device 120 without being exposed to screen time.

In operation, when communications module 132 receives media data from computing device 140, media device 130 may be configured to cause output module 131 to play or display the media data. According to some embodiments, once the media has been played or displayed, media device 130 may be configured to cause communications module 132 to communicate this with computing device 140.

In use, media device 120 may be configured to turn on when user input is received by input module 124 via user input 128. For example, where user input 128 comprises an accelerometer, media device 120 may be configured to turn on when the accelerometer senses that media device 120 has been subjected to a predetermined movement pattern, such as by being shaken three times, or tilted two times, for example. Once media device 120 has turned on, media device 120 may communicate this to the user by way of user output 129. For example, media device 120 may play a sound or flash a light. Media device 120 may also communicate with computing device 140 via communications module 126 to let computing device 140 know that it has been turned on, Having received a signal from media device 120 indicating that media device 120 has been turned on, processor 141 of computing device 140 may execute application 144 stored in memory 143. Application 144 may require a user to login and select a game or series of tasks to be presented to a second user via media device 140. According to some embodiments, computing device 140 may be configured to be operated by a parent, teacher or supervisor of a child, and media device 120 may be configured to be operated by the child to participate in the game or to complete the series of tasks. According to some embodiments, application 144 may store user data for multiple users associated with media device 120, which may be different to the user data stored for the user of computing device 140. The user of computing device 140 may be presented with user profiles for the users of media device 120, allowing a user profile to be selected. The user of computing device 140 may be able to make further selections that may affect the content to be presented by media device 120. For example, the user of computing device 140 may be able to select a game level, room or location in which the game is to be played, and language. Processor 141 may be configured to process the received selections to determine the executable instructions and/or media to be sent to media device 120.

Once the executable instructions to be sent to media device 120 have been determined by processor 141, computing device 140 may be configured to send executable instructions to media device 120 via communications module 142. According to some embodiments, computing device 140 may further be configured to send playable media, which may be in the form of audio files, to media device 120 via communications module 142. The playable media may comprise a series of tasks, questions or puzzles to be communicated to a user by media device 120. According to some alternative embodiments, the media may already be stored in memory 122 of media device 120.

Having received the executable instructions from computing device 140 via communications module 126, processor 121 may store the instructions in memory 122, ready for execution. When media device 120, or tag sensor module 123, comes into proximity with an ID tag 110 or an object that can be identified by a sensor of media device 120, processor 121 may execute the instruction code stored in memory 122 to cause processor 121 to instruct tag sensor module 123 to read identification code 115 or to otherwise identify the object, such as by performing image recognition, for example. According to some embodiments, processor 121 may receive identification code 115 from tag sensor module 123, and identify one or more media files to be delivered to the user based on the identification code 115. The identification code 115 may be stored in memory 122 as part of an interaction history. According to some embodiments, processor 121 may receive other data from tag sensor module 123 associated with the detected object, and may identify one or more media files to be delivered to the user based on the received data. Processor 121 may send the media file to output module 125, which may cause the media file to be delivered to the user via user output 129, for example by playing an audio file via a speaker.

If the instructions stored in memory 122 indicate that a user response is expected, processor 121 may further instruct input module 124 to capture a user response via user input 128, such as a microphone, and cause the captured user response to be stored in memory 122 as part of the interaction history. According to some embodiments, the user response may be received by tag sensor module 123 in response to a user bringing media device 120 into proximity with a further tag 110 or other object. Once the game or series of tasks being presented by media device 120 to the user is over, media device 120 may communicate the interaction history to computing device 140, and power off. The interaction history may include user details, time of gameplay, room or location of gameplay, level, language, tags 110 and objects interacted with, instructions given by media device 120, and media file names of media delivered by media device 120, in some embodiments, According to some embodiments, media device 120 may communicate the completion of the game to the user via user output 129, such as by playing a sound.

According to some embodiments, a user may finish a game by bringing media device 120 into proximity with a designated "home" tag 110, to indicate that they wish to stop the game. According to some embodiments, media device 120 may determine that the game is over when no tags 110 have been detected for a predetermined time period, which may be 5 minutes, 10 minutes, 20 minutes or 30 minutes in some embodiments. According to some embodiments, media device 120 may determine that the game is over when no motion has been detected from an accelerometer within user input 128 for a predetermined time period, which may be 5 minutes, 10 minutes, 20 minutes or 30 minutes in some embodiments.

The method of operation of system 100 is described in further detail below with reference to FIGS. 3 and 4.

Computing device 140 may be a handheld computing device such as a smart phone, tablet, smart watch, personal digital assistant (PDA), or other handheld computing device. In some embodiments, computing device 140 may be a laptop computer, desktop computer, server device, or a smart home device such as Google Home. As described above, computing device 140 may be configured to send instructions and media to media device 120 for execution and delivery. Computing device 140 may also be used to facilitate an initial installation of ID tags 110, to allow a user to log on to system 100 with a user profile, and to facilitate the receipt and of user responses to the delivered media.

Computing device 140 comprises a processor 141 and a memory 143. Processor 141 may be configured to access data stored in memory 143, to execute instructions stored in memory 143, and to read and write data to and from memory 143. Processor 141 may comprise one or more microprocessors, central processing units (CPUs), application specific instruction set processors (ASIPs), or other processor capable of reading and executing instruction code.

Memory 143 may comprise one or more volatile or non-volatile memory types, such as RAM, ROM, EEPROM, or flash, for example. Memory 143 may store an application 144, such as an interactive learning application, configured to be executable by processor 141. When executed by processor 141, application 144 may be configured to cause computing device 140 to facilitate an interactive learning program with a subject. In particular, application 144 may cause computing device 140 to communicate with one or more of media device 120 and cloud server 150 to determine interactions initiated by the subject, and to determine responses that should be returned to the subject, as described in further detail below.

Application 144 may also facilitate installation of ID tags 110 in an environment, by facilitating an installation mode. For example, processor 141 may be configured to execute application 144 to cause the computing device 140 to operate in an installation mode. When in the installation mode, computing device 140 may be configured to display the object or location type of an ID tag 110 scanned by media device 120, to allow the ID tags 110 to be installed in their correct locations.

Processor 141 may be configured to communicate with a communications module 142, which may be configured to allow computing device 140 to communicate with external devices such as media device 120 and/or cloud server 150. Communications module 142 may be configured to facilitate communication via a wired or wireless communication protocol, which may include Bluetooth, Bluetooth Low Energy, Wi-Fi, NFC, Ethernet, USB, or another communication protocol.

Cloud server 150 may be cloud based distributed server system storing application code and data. Cloud server 150 comprises a communications module 152 to facilitate communication between cloud server 150 and/or computing device 140.

Communications module 152 may be configured to facilitate communication via a wired or wireless communication protocol, which may include Bluetooth, Bluetooth Low Energy, Wi-Fi, NFC, Ethernet, USB, or another communication protocol.

Cloud server 150 stores a server application 151. Server application 151 may comprise executable program code, and may operate as a differentiation engine for decision making Server application 151 may use artificial intelligence and computer learning to make decisions based on available data. In particular, server application 151 may be configured to receive user credential information, identification codes 115 and subject input data recorded by input module 124 from computing device 140, and to determine media data to be played to the subject via media device 130 in response.

Server application 151 may also draw on data other than that received from computing device 140 to inform its decision making. For example, server application 151 may retrieve data from a database 153, which may be stored in cloud server 150, to facilitate its decision making Database 153 may store context based data points based on user interaction with system 100. For example, database 153 may store data points related to spatial and/or temporal aspects of a user's interaction with system 100, such as the location and/or time at which an interaction occurred. Database 153 may also store data points related to the frequency and/or latency of a user's interaction, such as data regarding when they last had an interaction, and/or how long it took a user to respond to an interaction by system 100. In some embodiments, database 153 may also record data regarding an identity of the user involved in the interaction, which may, for example, be based on user credentials used to login to the system 100. When cloud server 150 receives information regarding an interaction received by computing device 140, whether from tag sensor module 123 or input module 124, details of the interaction may be stored in database 153.

Server application 151 may also retrieve data from a cloud database 154 to facilitate decision making. Cloud database 154 may store search engine gathered data acquired to provide regional, environmental and cultural context to responses delivered by system 100. For example, cloud database 154 may determine and store information regarding where in the world computing device 140 is located, and/or cultural and/or regional information about the location of computing device 140, such as the dates of local holidays, items of local news, and local languages.

In operation, when cloud server 150 receives data relating to a user interaction history via communications module 152, server application 151 retrieves relevant data from database 153 and from cloud database 154, and determines future responses to be delivered to the user. The responses are sent to computing device 140 via communications module 152 to be delivered to media device 130.

Figure 2:
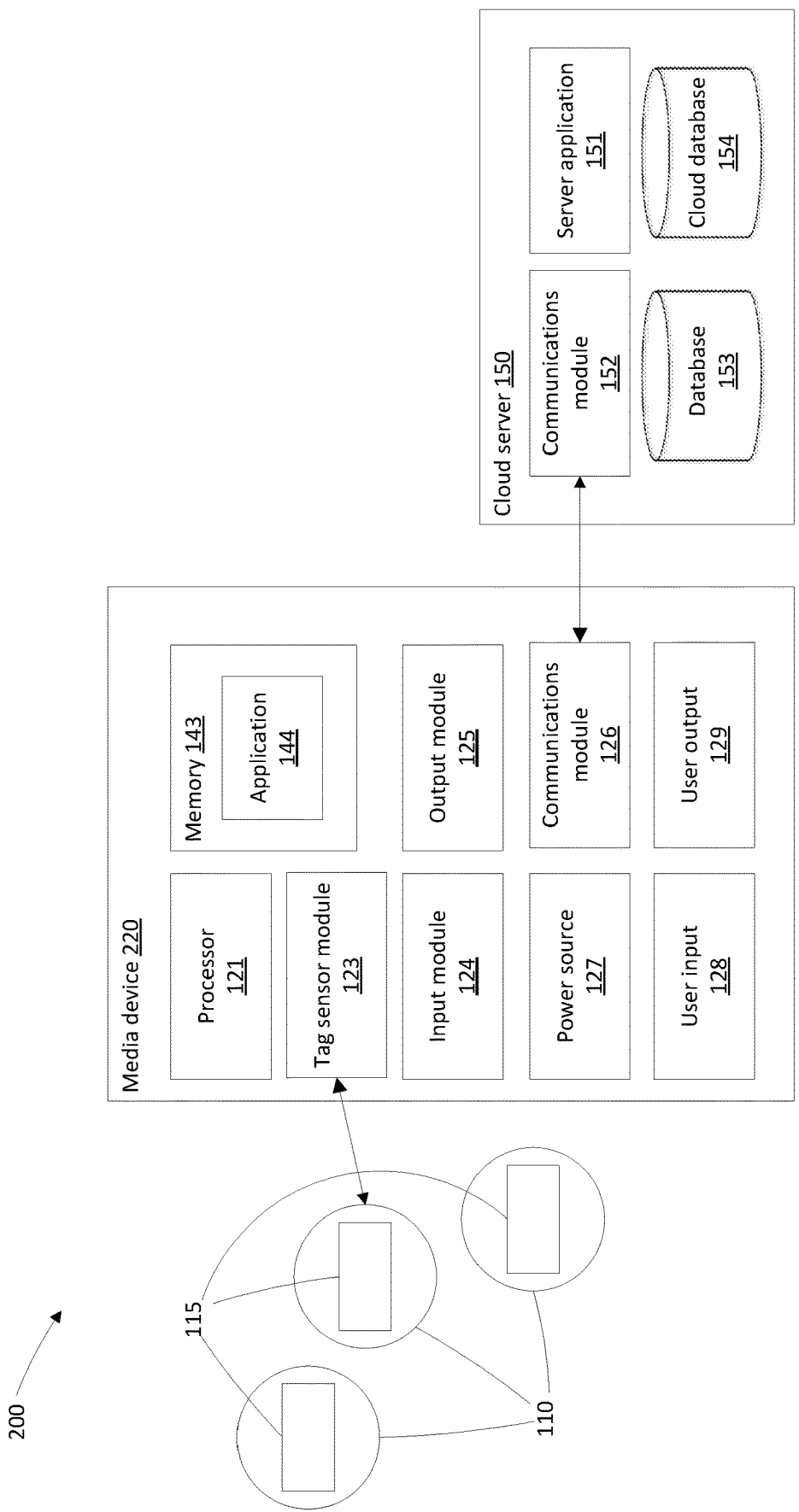
FIG. 2 shows a block diagram of an interactive learning system, according to some alternative embodiments.

FIG. 2 shows am alternative system 200, having ID tags 110 and a cloud server 150 as described above with reference to system 100 of FIG. 1. System 200 differs from system 100 in that media device 220 of system 200 comprises memory 143 storing application 144, so that no computing device 140 is required. Media device 220 of system 200 is configured to communication directly with cloud server 150 via communications module 126. According to some embodiments, system 200 may alternatively not include any ID tags 110, and may operate as described with reference to a system 100 having no ID tags 110.

Media device 220 comprises a processor 121, as described above with reference to FIG. 1. Media device 220 further comprises memory 143 storing an application 144 configured to be executable by processor 121. Application 144 may be configured to cause media device 120 to facilitate an interactive learning program with a subject, as described above with reference to FIG. 1.

Processor 121 may be configured to access data stored in memory 143, to execute application 144, and to read and write data to and from memory 143. Processor 121 may also be configured to communicate with one or more peripheral devices via one or more input and/or output modules, such as tag sensor module 123, input module 124, output module 125 and communications module 126, as described above with reference to FIG. 1. Communications module 126 may be configured to allow media device 220 to communicate with external devices such as cloud server 150.

Input module 124 may be configured to receive input signals from user input 128, while output module 125 may be configured to deliver output signals to user output 129, as described above with reference to FIG. 1.

Media device 120 further comprises a power source 127, which may be a battery in some embodiments.

While FIGS. 3 and 4, as described in further detail below, refer to system 100 of FIG. 1, it is envisaged that corresponding methods and scenarios to those described with reference to FIGS. 3 and 4 would exist for system 200.

Figure 3:
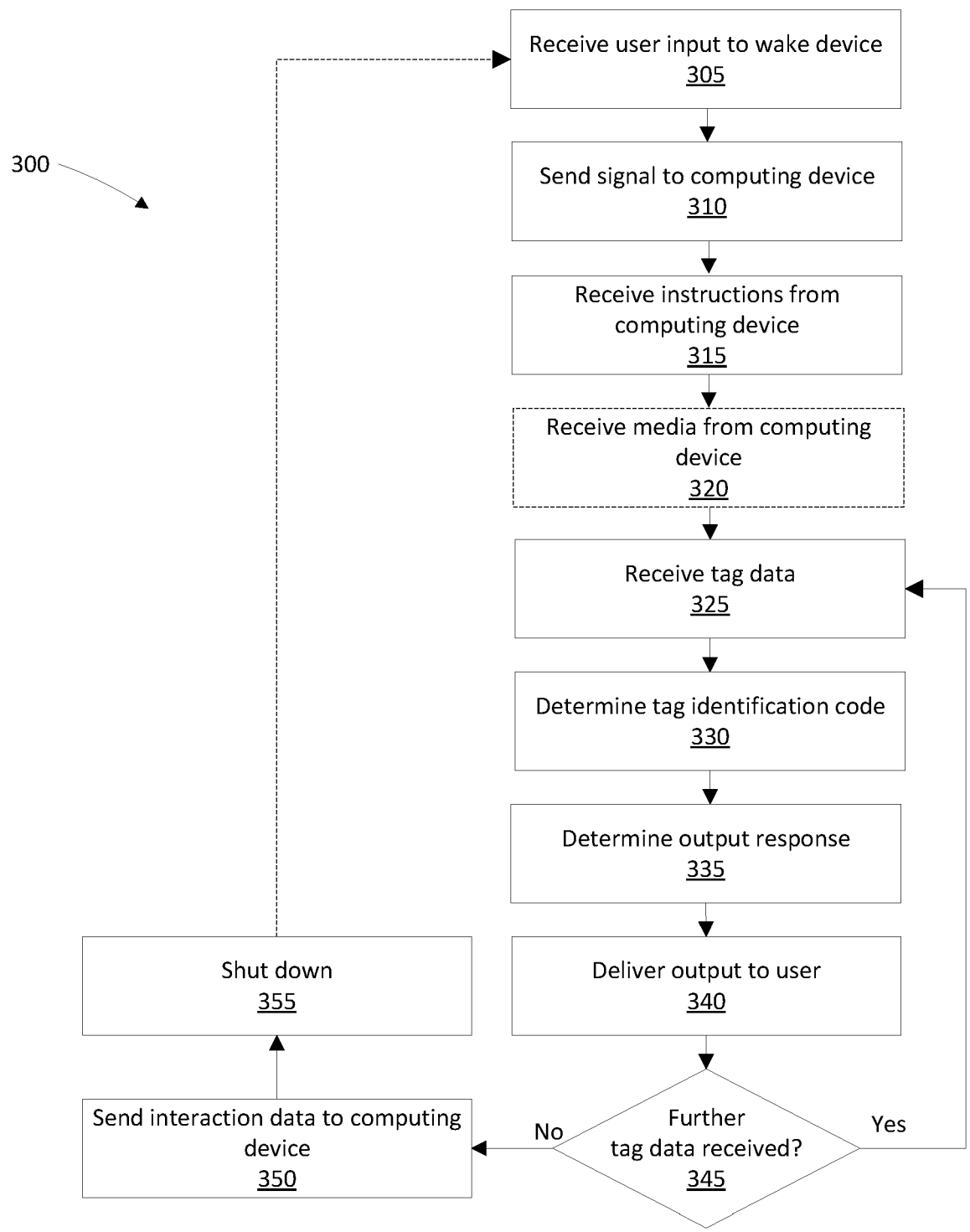
FIG. 3 shows a flowchart illustrating a method of facilitating interactive learning, as performed by a computing device of the interactive learning system of FIG. 1.

FIG. 3 shows a method 300 of facilitating an interactive learning process, as performed by media device 140 of FIG. 1. In some embodiments, processor 121 is configured to execute computer code received from computing device 140 to cause media device 120 to carry out method 200.

At step 205 of method 200, input module 124 of media device 120 receives an input signal from user input 128 indicating that media device 120 should power on or wake up. The input signal may be received from an accelerometer or a microphone, for example.

At step 310, media device 120 powers on or wakes up and sends a signal to computing device 140 via communications module 126 to indicate that it has powered on.

At step 315, media device 120 receives instructions from computing device 140 via communications module 126, which are stored in memory 122. According to some embodiments, at optional step 320, media device 120 further receives playable media, which may include audio files, from computing device 120 via communications module 126. The media may also be stored in memory 122.

At step 325, data to indicate an initiation of an interaction is received by processor 121 from tag sensor module 123. Specifically, data indicative of an interaction between an ID tag 110 and tag sensor module 123 may be received. In some embodiments, data indicative of an interaction between an object detected by user input 128 and tag sensor module 123 may be received.

At step 330, processor 121 executing instructions stored in memory 122 determines the identification code 115 or the object type received or determined by tag sensor module 123. In some embodiments, processor 121 may determine the identification code 115 by comparing data received with a list of identification codes stored in memory 122. Processor 121 may store the identification code 115 in memory 122.

At step 335, having determined the identification code 115 received, processor 121 determines the output response to be delivered. This may be determined by retrieving the media file stored in memory 122 in association with the identification code 115.

At step 340, processor 121 communicates the media file to output module 125, which causes the media file to be delivered to the user via user output 129. For example, where the media is an audio file and user output 129 comprises a speaker, output module 125 causes user output 129 to play the audio file.

At step 345, media device 120 determines whether further tag data or object data has been received by tag sensor module 123. If it has, processor 121 continues executing method 300 from step 325. If not, after a predetermined period where no further user interaction is detected, at step 350 processor 121 may cause any stored data from memory 122 to be sent to computing device 140 via communications module 126.

Subsequently, at step 355, media device 120 may power off, shut down or go into a sleep mode, waiting for a further user input to be received to wake it up. According to some embodiments, any stored data in memory 122 may be deleted from memory 122 prior to media device 120 being powered off, shut down, or put into sleep mode. According to some alternative embodiments, the data stored in memory device 122 may remain in memory device 122 until media device 122 is powered on or woken up and re-connected with computing device 140.

Figure 4:
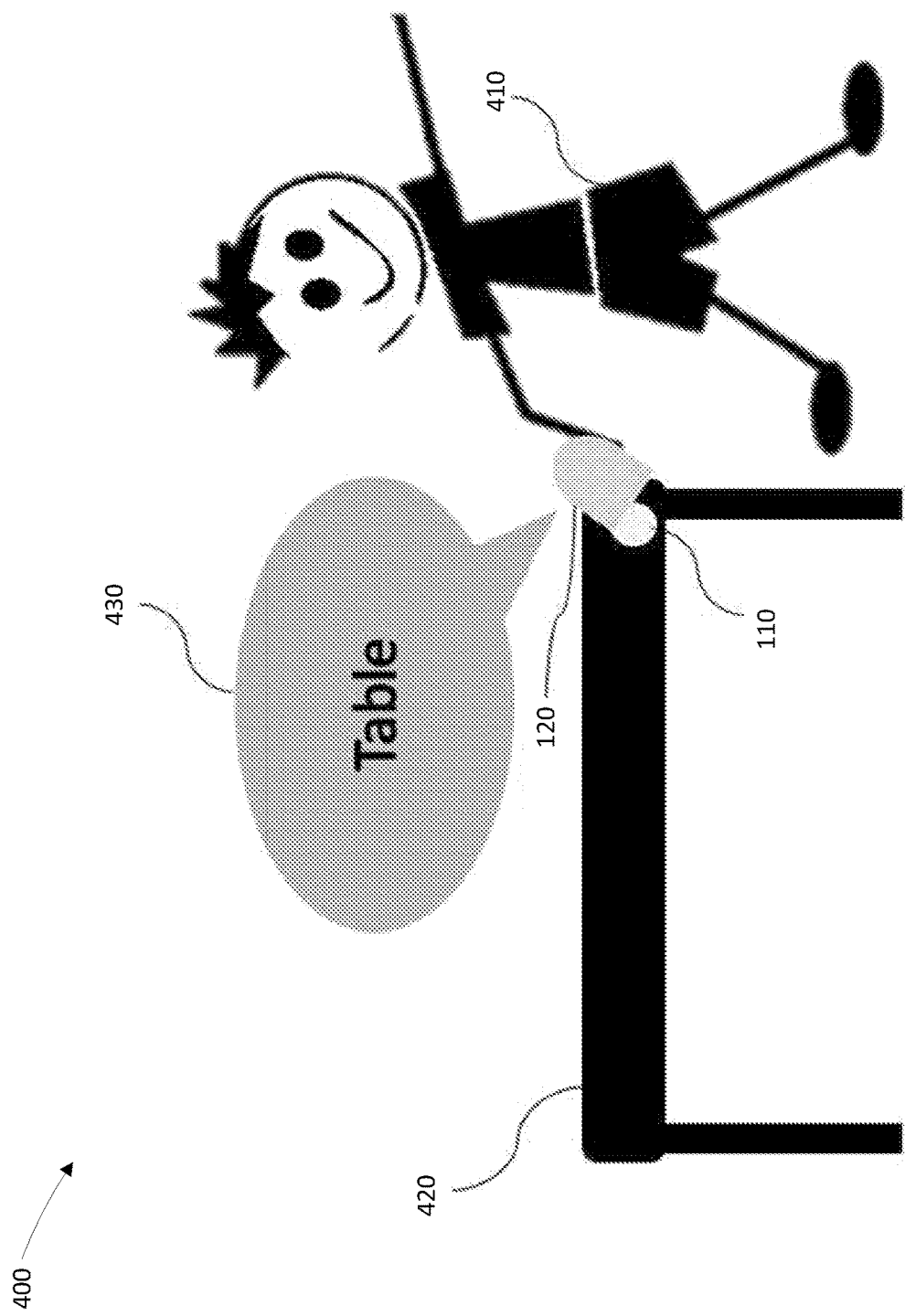
FIG. 4 shows a diagram illustrating the interactive learning system of FIG. 1 in use.

FIG. 4 shows an example scenario 400 illustrating use of an example system 100 by a user 410, according to the method described above with reference to FIG. 3.

User 410 brings a media device 120 into proximity with ID tag 110 attached to a table 420. Media device 120 reads identification code 115 on ID tag 110, and communicates this to media device 120.

Computing device 120 looks up the identification code 115 in memory 122, and determines that the identification code 115 is associated with a "table" object. Media device 120 selects a media response corresponding to the "table" object type. The selected response in the illustrated embodiment is an audio file comprising someone speaking the word "table".

Processor 121 of media device 120 communicates the media to output module 125, which causes the media to be played by user output 129 in the form of audio 430. User 410 hears media device 120 say the word "table".

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A media device for facilitating language learning, the media device comprising:
    a communications module for facilitating communication between the media device and a computing device via a cloud server;
    a processor; and
    memory accessible to the processor and storing executable code, wherein when the executable code is executed by the processor, the processor is caused to:

receive executable instructions from the cloud server via the communications module and store the instructions to the memory;

subsequently to receiving the executable instructions, receive data indicative of user interaction with an identification tag, wherein the data comprises an identification code;

execute the executable instructions to determine an auditory response to be delivered to the user based on the identification code, the auditory response being indicative of playable media;

receive the playable media from the cloud server via the communications module;

cause the playable media to be delivered to the user; and provide an interaction history to the cloud server, the interaction history indicative of the user interaction with the identification tag, determine a further auditory response to be delivered to the user based on the identification code and the interaction history;

wherein the playable media includes an audio file, and wherein the media device is free from tactile user input devices and free from display screens.

2. The media device of claim 1, further comprising a tag sensor module, wherein the processor is configured to receive the data indicative of the user interaction with the identification tag from the tag sensor module.

3. The media device of claim 1, further comprising an output module, wherein the processor causes the playable media to be delivered to the user by outputting the playable media via the output module.

4. The media device of claim 1, further comprising an input module, wherein the media device is configured to wake up from a sleep mode when user input is received via the input module.

5. The media device of claim 1, further comprising an input module, wherein the media device is configured to power on from a powered down mode when user input is received via the input module.

6. The media device of claim 4, wherein the input module comprises at least one of an accelerometer and a microphone.

7. The media device of claim 1, wherein the processor is further configured to store at least one of the playable media and the identification code in memory.

8. The media device of claim 1, wherein the processor is further configured to retrieve the stored identification code from memory and send it to the cloud server.

9. A kit for facilitating language learning via interaction with objects in an environment; the kit comprising:
  at least one identification tag comprising an identification code;
  a media device comprising:
    a communications module for facilitating communication between the media device and a computing device via a cloud server;
    a processor; and
    memory accessible to the processor and storing executable code, wherein when the executable code is executed by the processor, the processor is caused to:
      receive executable instructions via the communications module and store the executable instructions to the memory;
      execute the executable instructions to determine an auditory response to be delivered to the user based on the identification code, the auditory response being indicative of playable media;
      receive the playable media from the cloud server via the communications module;
      cause the playable media to be delivered to the user; and
      provide an interaction history to the cloud server, the interaction history indicative of the user interaction with the identification tag;
      determine a further auditory response to be delivered to the user based on the identification code and the interaction history;
      wherein the playable media includes an audio file, and wherein the media device is free from tactile user input devices and free from display screen.

10. The kit of claim 9, further comprising a tag sensor module, wherein the media device is configured to receive the data indicative of the user interaction with the identification tag from the tag sensor module.

11. The kit of claim 9, further comprising an output module, wherein the media device causes the response to be delivered to the user by outputting the playable media via the output module.

12. The kit of claim 9, further comprising an input module, wherein the media device is configured to perform at least one of:
  wake up from a sleep mode when user input is received via the input module; and
  power on from a powered down mode when user input is received via the input module.

13. The kit of claim 12, wherein the input module comprises at least one of a microphone and an accelerometer.

14. The media device of claim 1, wherein the user interaction with the identification tag comprises bringing the media device in close proximity to the identification tag coupled to, or disposed on, one of a variety of corresponding physical objects.

15. The media device of claim 1, wherein the interaction history includes at least one of user details, a time, a location, a game level, a language, identification tags interacted with, instructions given by the media device, and data indicative of playable media delivered by the media device.

16. The media device of claim 1, wherein the executable instructions are indicative of at least one of a game, and a series of tasks for the user.

17. The media device of claim 1, wherein the interaction history includes data indicative of a user interaction with a further identification tag.

18. The media device of claim 1, wherein the determining the auditory response to be delivered to the user is based on the interaction history.

19. The media device of claim 1, wherein the determining an auditory response to be delivered to the user is based on an identity of the user.

20. A media device for facilitating language learning, the media device comprising:
  a communications module for facilitating communication between the media device and a computing device via a cloud server;
  a processor; and
  memory accessible to the processor and storing executable code, wherein when the executable code is executed by the processor, the processor is caused to:
    receive executable instructions from the cloud server via the communications module and store the executable instructions to the memory;

subsequently to receiving the executable instructions, receive data indicative of user interaction with an identification tag, wherein the data comprises an identification code;

execute the executable instructions to determine an auditory response to be delivered to the user based on the identification code, the auditory response being indicative of playable media;

receive the playable media from the cloud server via the communications module;

cause the playable media to be delivered to the user;

provide an interaction history to the cloud server, the interaction history indicative of the user interaction with the identification tag;

receive data indicative of a further user interaction with the identification tag, wherein the data comprises the identification code;

execute the executable instructions to determine a further auditory response to be delivered to the user based on the identification code and the interaction history;

receive the further auditory response from the cloud server via the communications module; and cause the further auditory response to be delivered to the user;

wherein the auditory response and the further auditory response are different, and wherein the media device is free from tactile user input devices and free from display screens.

* * * * *